United States Patent Office 3,378,590
Patented Apr. 16, 1968

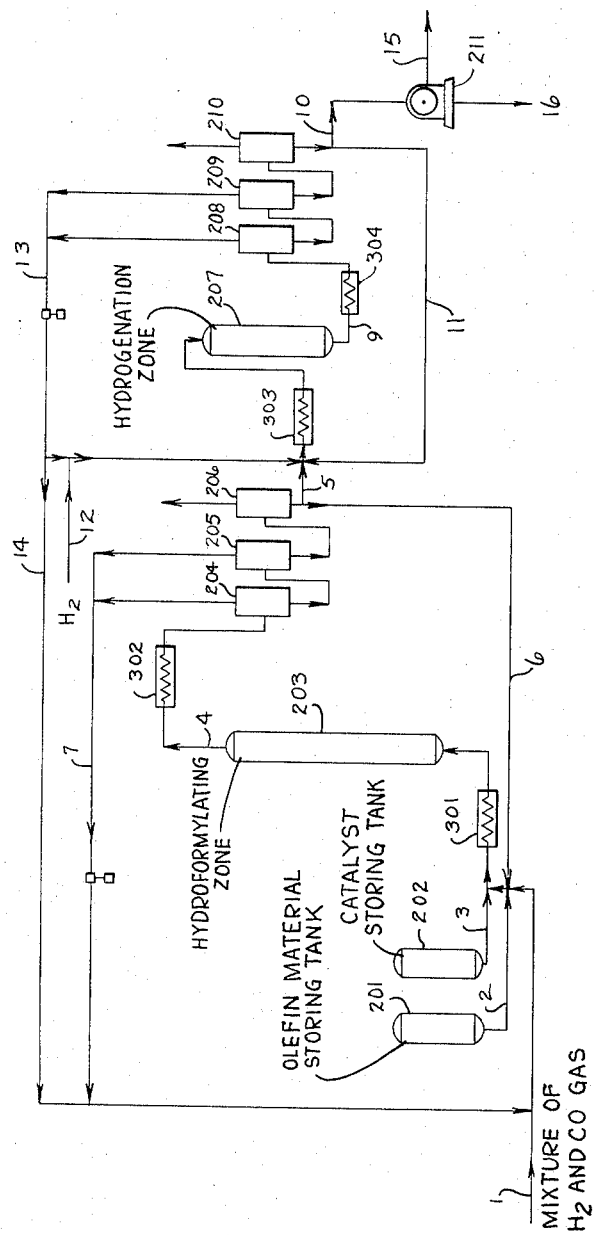

3,378,590
PRODUCTION OF ALDEHYDES AND/OR ALCOHOLS FROM COMPOUND HAVING OLEFINIC DOUBLE BONDS
Seiji Usami, Takayoshi Kondo, and Kotaro Nishimura, Ohimura, and Yuzo Koga, Tokyo, Japan, assignors to Toa Nenryo Kogyo Kabushiki Kaisha, Tokyo, Japan, a corporation of Japan
Filed May 24, 1965, Ser. No. 458,129
Claims priority, application Japan, May 27, 1964, 39/29,716; Apr. 13, 1965, 40/21,550
14 Claims. (Cl. 260—598)

ABSTRACT OF THE DISCLOSURE

A process for producing oxygen-containing compounds, such as aldehydes and alcohols, in which an olefinic compound, carbon monoxide and hydrogen are reacted in the presence of a cobalt catalyst and a promoter selected from the group consisting of palladium supported on carbon and platinum supported on carbon, in a hydroformylating reaction zone, then the resulting reaction product can be introduced without change into a hydrogenating reaction zone and hydrogenated in the presence of hydrogen, and the cobalt catalyst is separated by decomposing the cobalt carbonyl in the hydrogenated product and by depositing it on the promoter.

---

This invention relates to the production of oxygen-containing compounds, such as aldehydes and alcohols, from compounds having olefinic double bonds and, more particularly, relates to the production of oxygen-containing compounds, such as aldehydes and alcohols, by the reaction of compounds having olefinic double bonds with carbon monoxide and hydrogen in the presence of a new substance having a promoting effect.

It is known to produce oxygen-containing compounds, such as aldehydes or alcohols, by hydroformylating compounds having olefinic double bonds, with carbon monoxide and hydrogen at a high temperature under a high pressure in the presence of a catalyst. The catalyst usually used in such case is a substance containing cobalt, rhodium or ruthenium. An inorganic or organic salt of cobalt is generally industrially used as the catalyst. It is known that the active form of such catalyst in actually performing the above-mentioned hydroformylating reaction is a metallic carbonyl. As the production of such metallic carbonyl requires a temperature higher than that used in the hydroformylating reaction, it is necessary to keep the reaction system at a very high temperature in the industrial operation using an ordinary metallic salt as a catalyst. Therefore, undesirable isomerization or various secondary reactions will be thereby accelerated and, as a result, for example, a branched oxygen-containing compound or a high boiling point substance will be produced as a by-product in substantial quantities. The economic value of such by-products is so low that an industrially practicable method of controlling the production of such by-products has been strongly desired.

An object of the present invention is to increase the yield of the oxygen-containing composition by reducing the amount of by-products from the hydroformylation by the use of a substance having a promoting effect and to economically hydrogenate the hydroformylation product by a simple industrial operation.

We have discovered that palladium supported on carbon and platinum supported on carbon are substances having the maximum promoting effect for the generally most prevalently used cobalt catalyst.

The present invention comprises carrying out a hydroformylating reaction and controlling the production of by-products at a temperature between 30 to 200° C. and at a pressure of 40 to 500 kg./cm.$^2$ by adding a cobalt catalyst composition to the reaction zone, and also adding palladium or platinum on a carbon carrier. The palladium or platinum on carbon carrier can be used, as it is, as a hydrogenating catalyst, without being activated and regenated in the subsequent hydrogenating reaction zone. The metallic carbonyl catalyst contained in the hydroformylation product can be decomposed in the hydrogenating reaction zone so that cobalt may be deposited as metal on the above-mentioned palladium or platinum on carbon carrier, thereby to separate the cobalt from the hydroformylation product, so that the cobalt can be continuously recirculated and used in the hydroformylating reaction zone.

The amount of the palladium or platinum on the carbon carrier added to the cobalt catalyst used in the present invention can be varied widely. However, for reasons of economy, when the amount of the cobalt-containing catalyst used is 0.1 to 1.0% by weight, calculated as cobalt, based on the weight of the compound having an olefinic double bond, then the palladium or platinum on the carbon carrier can be used in an amount within a range of 0.005 to 1.5% by weight, preferably 0.02 to 0.6% by weight, calculated as metallic palladium or metallic platinum, based on the weight of the compound having an olefinic double bond. Further, the amount of the metallic palladium or metallic platinum carried in the carbon carrier will be in the range of 0.5 to 15% by weight or preferably 3 to 10%, by weight.

The palladium or platinum supported on carbon used in the present invention is generally widely known as a catalyst for hydrogenating reactions as reported, for example, by R. Mozingo et al. (J. Am. Chem. Soc., 67, 2092 (1945)). The method by which it is prepared is mentioned, for example, by R. Mozingo (Organic Synthesis, vol. 26, p. 77 (1948)), or H. Kaffer (Ber., 57, 126.1 (1924)). Detailed examples of the preparing method shall be described in the later-mentioned examples. For the carbon carrier, there can be used, for example, coal, coke, charcoal or active carbon. However, it is preferable to use active carbon. The active carbon can be prepared from coal, animal charcoal, or wood or coconut shells. However, in the present method, active carbon made from wood is adequate. Further, the physical condition of the active carbon is determined by the method of feeding the catalyst, prepared by using active carbon as a carrier, to the reaction zone. For example, in the case where the catalyst is fed to the reaction zone by a suspension system, a powdered, so-called "powdery," active carbon may be used. In the case where the catalyst is fed to the reaction zone by a fixed bed system, a coarsely crushed, so-called "crushed," active carbon or a granularly molded, so-called "granular," active carbon may be used.

If any solvents inert to olefinic raw materials, such as saturated hydrocarbons, alcohols, aldehydes, and ethers, are used in the method of the present invention, the action of the above-described palladium or platinum on carbon carrier will not be obstructed.

Further, for the raw material there can be used aliphatic olefins, cycloolefins and aromatic olefins. It is also possible to employ any other compounds having olefinic double bonds. For example, $C_2$–$C_9$ aliphatic olefins, cyclopentene, cyclohexene, styrene, acrylonitrile, etc., are employable as the raw materials.

The other reaction conditions to be used in the present method can be determined in the same manner as in known hydroformylating reactions and need not be specifically considered. In the present invention, as the reaction temperature can be made lower than in known methods, it is possible also to reduce the pressure and therefore it is easy to control the temperature of the reaction system.

The difference of the method according to the present invention as compared with a known general method shall be explained in the following with reference to a specific embodiment. Cobalt naphthenate, which is a typical cobalt-containing catalyst, providing 0.22 g. of cobalt, 100 ml. of normal hexane as a solvent and 40 g. of propylene as an olefin was weighed and was placed in an autoclave of a capacity of 500 ml., and then synthesis gas of $H_2/CO=1.2$ was fed into the autoclave under an initial pressure of 150 kg./cm.$^2$ and the contents were heated by elevating the temperature at a rate of 0.8° C./min. with agitation. When the temperature reaches about 170° C., a reaction will begin with quick heat generation. After the reaction is carried out for 20 minutes while the temperature is kept at 180° C., the reaction product is cooled and removed. About 70% of the propylene will be reacted, the ratio of butyl aldehyde to isobutyl aldehyde (which shall be abbreviated as the n/i ratio hereinafter) in the product will be about 1.0 to 1.2 and the high boiling point substance will be about 7 to 12% by weight in the liquid product.

The above is the experimenting method most generally used and the results of such a hydroformylating process can be compared for the purpose of determining the catalytic activity. However, according to the method of the present invention, as is made clear also in the later described examples, under the same set of conditions, but also using palladium or platinum supported on a carbon carrier, the reaction will begin at 87° C., the rate of reaction will be 62%, the n/i ratio of the butyl aldehyde in the product will be 4 and the high boiling point substance will be about 2% by weight in the liquid product. The production of the high boiling point substance and the by-product having a branched chain is remarkably small.

Further, there is a great advantage that, in the case of carrying out the method of the present invention in industrial equipment, the form of the carrier can be selected freely according to the requirements of the equipment. For example, where the additive according to the present invention is used in a suspended state, it is possible to use a carrier such as active carbon, whose apparent specific gravity, granularity and hardness can be freely selected according to the specific gravity and speed of the fluid in the reaction system. Also, in the case of using a solid bed system, the form of the carrier can be freely determined according to the requirements of the reaction system. Further, it is also a great advantage to the industrial process that, in preparing said palladium or platinum supported on carbon carrier, there is no specific need of any expensive treating agent or costly equipment.

Further, one of the most important features of the method of the present invention is that the palladium on carbon carrier or platinum on carbon carrier once used for hydroformylation can be easily used, as it is, as a hydrogenating catalyst without being activated and regenerated at all. That is to say, in a process for producing alcohols by the so-called oxo method used widely in the industry, an alcohol is produced by removing the catalyst from the aldehyde-containing liquid produced in a hydroformylating step by adding a proper decatalysting agent, distilling the liquid, then transferring it to a hydrogenating step and catalytically reducing it. On the other hand, according to the method of the present invention, for example, if a reaction product in which palladium or platinum supported on carbon added in hydroformylation step is suspended, as it is, without being separated, is introduced into a hydrogenating reaction step, the palladium or platinum supported on carbon will remarkably show a function as a hydrogenating catalyst and, therefore, an alcohol can be produced at a high rate of yield without requiring any new separate hydrogenating catalyst to be added. A further advantage in such case is that, as no generally practiced decatalysting operation is always required, the procedure will be simplified and the expense for the decatalysting operation and a large amount of the cost of recovering the catalyst metal from the decatalysted liquid will be saved. That is to say, in the generally widely practiced oxo method, for example, cobalt carbonyl which has performed a catalytic action in the hydroformylating step is decomposed with a proper decatalysting agent so as to be present in the form of a metallic cobalt or cobalt salt and, as required, the cobalt is recovered and reused. On the other hand, according to the method of the present invention, the metallic cobalt produced when cobalt carbonyl is decomposed in the hydrogenation reaction step will be deposited on the palladium on carbon carrier or platinum on carbon carrier suspended in the liquid. Therefore, it can be easily separated from the hydrogenated liquid and be recirculated and used as a hydroformylating catalyst, and it will not be always necessary to carry out separately a decatalysting operation and cobalt recovering equipment as is generally known will not be required.

The accompanying drawing is a flow sheet showing an example of the aparatus used for continuously carrying out the method of the present invention. The present invention shall be explained more particularly in the following with reference to the drawing.

A mixed liquid of a hydroformylating catalyst solution and a liquid prepared by suspending the palladium on carbon carrier or the platinum on carbon carrier in a proper medium is fed through pipe 3 from a catalyst storing tank 202. A material having an olefinic double bond is fed through pipe 2 from an olefinic raw material storing tank 201. Further, a mixed high pressure gas of carbon monoxide and hydrogen is fed through a pipe 1. They are passed through a heat exchanger 301, are thus heated to a fixed temperature and are then introduced into a hydroformylating reaction zone 203. The reaction product produced after they are kept in the reaction zone for a fixed period enters a heat exchanger 302 through a pipe 4, is thus cooled and is then led to high pressure receiver 204, medium pressure receiver 205 and low pressure receiver 206 so as to be separated into gas and liquid. The gas separated in such case is returned to the pipe 1 through a pipe 7 and is recirculated and used again. The separated liquid is fed to a hydrogenating reaction zone 207 through a pipe 5 and a heat exchanger 303. However, as required, a part of the liquid from the low pressure receiver 206 can be recirculated to the hydroformylating reaction zone through a pipe 6. Hydrogen to be used in the hydrogenating reaction zone is fed through a pipe 12. However, the gas produced in the case of the gas-liquid separation after the hydrogenating reaction may be recirculated and fed through a pipe 13. But, in such case, when an amount larger than a certain fixed amount of carbon monoxide produced by the decomposition of a metallic carbonyl has come to be accumulated in the gas fed through the pipe 13, the circulation to the hydrogenating reaction zone 207 should be stopped and the circulation to the hydroformylating reaction zone should be made through a pipe 14 so that the gas may be used to adjust the concentration of the incoming gas. Further, in the hydrogenating reaction zone, as described above, the metallic carbonyl dissolved in the liquid will be decomposed to produce the metal which will be deposited on the palladium on carbon carrier or platinum on carbon carrier suspended in the liquid and the suspension will enter a heat exchanger 304 through a pipe 9. After the suspension is thus cooled, it is led to high pressure receiver 208, medium pressure receiver 209 and low pressure receiver 210 and the gas separated therefrom. The liquid is then fed to a catalyst separator 211 which may be of a centrifugal separation type or a filtration type. The liquid part separated by the catalyst separator is fed through the pipe 15 to the next step, which may be a distillation procedure. The solid part is taken out of the system at 16, is then fed to a catalyst preparing procedure and is again circulated and used.

Specific nonlimiting examples are given in the following.

Example 1

The palladium supported on active carbon was prepared by the following process. A powdered active carbon of such a size that it passed through a 300 mesh screen was mixed with a solution of 10% nitric acid, was heated on a water bath for about 2.5 hours, was filtered, was then washed with water and was well dried at 100 to 110° C. Ninety-three g. of this active carbon were placed in a beaker of a capacity of 4 liters and were heated to 80° C. together with 1.2 liters of water and 8.2 g. (0.046 mol) of palladium chloride dissolved in 20 ml. of concentrated hydrochloric acid and then 50 ml. of water were added thereto. Then 8 ml. of an aqueous solution of 37% formalin were mixed therein. An aqueous solution of 30% caustic soda was added to the suspension until the suspension was weakly alkaline. The suspension was warmed for 5 minutes while being stirred. It was then filtered, was washed with water and then was well dried.

The preparing method where chromium oxide, titanium oxide, calcium carbonate, activated clay and aluminum oxide were used as carriers of palladium was as follows. In this method, 8.2 g. of palladium chloride were dissolved in 8.2 ml. of hydrochloric acid and 50 ml. of water. The solution was added to a solution prepared by suspending 93 g. of any one of the above-mentioned carriers in 1.2 liters of water and heating the suspension to 80° C. Further, 8 ml. of an aqueous solution of 37% formalin were mixed with the solution and the mixed solution was then made alkaline with an aqueous solution of 30% caustic soda and was formed for 5 minutes. The solution was filtered, was washed with water and then was well dried.

The method of preparing palladium black was according to R. Willstaetter (Ber., 54, 113 (1921)). That is to say, 7 g. of palladium chloride were dissolved in a mixed solution of 6 ml. of hydrochloric acid and 110 ml. of water, 50 ml. of an aqueous solution of 33% formalin were added thereto, the solution was cooled to −10° C. and 100 g. of an aqueous solution of 50% caustic potash were added thereto over 10 minutes while vigorously agitating it. The temperature was kept at 0 to 3° C. while controlling heat generation. After the deposition of palladium was confirmed, the solution was warmed to 60° C. for 25 minutes, was then filtered, was washed with water and was well dried.

Cobalt naphthenate equivalent to 0.22 g. of cobalt, palladium on carbon carrier (containing 5% palladium and of a particle size passing through a screen of 300 meshes per inch) equivalent to 0.16 g. of palladium, 100 ml. of normal hexane as a solvent and 40 g. of propylene as an olefin were weighed and were fed into an electromagnetically agitated type autoclave having a capacity of 500 ml. A synthesis gas of $H_2/CO=1.2$ was fed into the autoclave under an initial pressure of 150 kg./cm.$^2$. The contents were heated to 60° C. quickly and then were further heated by elevating the temperature at a rate of 0.8° C. per minute while being agitated. A reaction began at a temperature of 87° C. The contents were then kept at 89° C. for 20 minutes and were cooled and the product was removed. As a result, 62% of the propylene was reacted, the n/i ratio of butyl aldehyde in the product was 4.0 and the high boiling point substance was 2.1% by weight.

The reaction-beginning temperature in case various palladium additives referred to above, used under the same conditions, was as follows:

| Kinds of palladium additives: | Reaction beginning temperature in ° C. |
|---|---|
| When not added | 170 |
| Palladium supported on chromium oxide | 158 |
| Palladium supported on titanium oxide | 152 |
| Palladium supported on calcium carbonate | 138 |
| Palladium black | 130 |
| Palladium supported on activated clay | 118 |
| Palladium supported on aluminum oxide | 115 |
| Palladium supported on carbon | 87 |

Example 2

Cobalt naphthenate equivalent to 0.22 g. of cobalt, palladium on carbon carrier equivalent to 0.16 g. of palladium, 100 ml. of the below-mentioned solvent and 40 g. of propylene were weighed and were fed into the same reactor as in Example 1. A synthesis gas was fed into the reactor in the same manner as in Example 1 and then the contents were made to react. The following results were obtained.

| Solvents | Reaction beginning temperature, ° C. | Amount of olefin reacted, percent | n/i ratio | High boiling point substance, percent |
|---|---|---|---|---|
| Normal hexane | 87 | 62 | 4.0 | 2.1 |
| n-Butyl alcohol | 85 | 63 | 4.2 | 1 9.3 |
| Diethyl ether | 84 | 59 | 4.1 | 1.8 |
| Hydroformylation product ² | 75 | 35 | 3.7 | 3.0 |

¹ It consisted mostly of butyl dibutyl acetal.
² The hydroformylation product was a liquid product obtained by removing the catalyst and distilling away the solvent after the hydroformylating reaction and had a composition of 76.8% n-butyl aldehyde, 19.2% i-butyl aldehyde, 1.0% n-butyl alcohol, 0.9% i-butyl alcohol and 2.1% high boiling point substance.

Example 3

Cobalt acetate equivalent to 0.22 g. of cobalt, palladium on carbon carrier equivalent to 0.16 g. of palladium, 100 ml. of normal hexane as a solvent and 40 g. of propylene were fed into the same reactor as in Example 1. A synthesis gas was fed into the reactor in the same manner as in Example 1. When the temperature was then elevated, the contents began to react at a temperature of 113° C. The contents were then kept for 20 minutes and were then cooled and the product was removed. As a result, the amount of propylene reacted was 51%, the n/i ratio of butyl aldehyde was 2.5 and the high boiling point substance was 1.0% by weight.

Example 4

Cobalt hydroxide equivalent to 0.22 g. of cobalt palladium on carbon carrier equivalent to 0.16 g. of palladium, 100 ml. of normal hexane and 40 g. of propylene were fed into the reactor and were made to react in the same manner as in Example 1. As a result, the reaction beginning temperature was 146° C., the maximum reaction temperature was 149° C., the amount of propylene reacted was 58%, the n/i ratio of butyl aldehyde was 1.7 and the high boiling point substance was 1.5% by weight.

Example 5

Dicobalt octacarbonyl equivalent to 0.22 g. of cobalt, palladium on carbon carrier equivalent to 0.16 g. of palladium, 100 ml. of normal hexane and 40 g. of propylene were weighed and fed into the reactor and were made to react in the same manner as in Example 1. As a result, the reaction beginning temperature was 83° C., the amount of propylene reacted was 62%, the n/i ratio of butyl aldehyde was 4.0 and the high boiling point substance was 0.6% by weight.

Example 6

The platinum supported on active carbon was prepared in the following manner. First, 95 g. of powdery active carbon of such a size that it passed through a screen of 300 meshes per inch were mixed with water, chloroplatinic acid solution containing 5 g. of platinum was added thereto, the mixture was warmed with a water bath at 50° C. for about three hours, was then cooled and was made alkaline with a concentrated aqueous solution of sodium carbonate and hydrazine hydrate was dropped into the mixture. The excess of the hydrazine was judged by the fact that, when a drop of the mixed solution was added to an aqueous solution of potassium permanganate, the aqueous solution became decolored. After the hydrazine was added well in excess, the mixture was warmed on a water bath for 1 to 2 hours. The mixture was filtered and was then washed with hot water until there were no more chlorine ions and alkali. The water was removed as much as possible. The mixture was then dried under a reduced pressure on calcium chloride in a desiccator for half a day.

Cobalt naphthenate equivalent to 0.22 g. of cobalt, platinum on carbon carrier (containing 5% platinum and of a size passing through a screen of 300 meshes per inch) equivalent to 0.3 g. of platinum, 100 ml. of normal hexane as a solvent and 40 g. of propylene were fed into the same reactor as in Example 1. A synthesis gas was fed into the reactor in the same manner as in Example 1. When the temperature was then elevated, the contents began to react at a temperature of 102° C. The contents were then kept at 107° C. for 20 minutes and were cooled and the product was taken. As a result, the amount of propylene reacted was 52%, the n/i ratio of butyl aldehyde was 2.6 and the high boiling point substance was 4.5% by weight.

Example 7

Cobalt naphthenate equivalent to 0.22 g. of cobalt, palladium on carbon carrier equivalent to 0.16 g. of palladium, platinum on carbon carrier equivalent to 0.10 g. of platinum, 100 ml. of normal hexane as a solvent and 40 g. of propylene were fed into the reactor and were made to react in the same manner as in Example 1. As a result, the reaction beginning temperature was 86° C., the amount of proplyene reacted was 61%, the n/i ratio of butyl aldehyde was 4.0 and the high boiling point substance was 2.2% by weight.

Example 8

The reaction was carried out as in Example 1. The reaction product was cooled. A mixed gas of carbon monoxide and hydrogen was discharged and the liquid product was taken for analysis. Hydrogen was then fed in anew under a pressure of 128 kg./cm.$^2$.

When the contents were heated by elevating the temperature at a rate of 0.8° C. per minute while being agitated, they began to react when the temperature reached 137° C. The contents were kept at this temperature for 60 minutes. After the contents were cooled, the composition of the produced liquid was analyzed. As a result, the rate of the hydrogenating reaction was 99.1%. No cobalt carbonyl was detected at all in the produced liquid but a large amount of cobalt was detected in the palladium on carbon carrier removed from the liquid. It is therefore presumed that the cobalt carbonyl dissolved in the produced liquid was decomposed at the time of the hydrogenating reaction and was deposited on the palladium on carbon carrier suspended in the liquid.

Example 9

A reaction was caused in the same manner as in Example 1 by using a waste catalyst separated by filtration from the hydrogenated liquid described in Example 8. That is to say, 0.16 g. of the waste catalyst as palladium, 0.22 g. of a total of the cobalt in the cobalt naphthenate and the cobalt contained in the waste catalyst, 100 ml. of normal hexane and 40 g. of propylene were fed into the reactor and were made to react for 20 minutes. As a result, the reaction beginning temperature was 86° C., the rate of reaction of propylene was 60%, the n/i ratio of butyl aldehyde was 4.1 and the high boiling point substance was 2.4% by weight.

Example 10

Cobalt naphthenate equivalent to 0.22 g. of cobalt, palladium on carbon carrier (containing 5% palladium and of a size passing through a screen of 300 meshes per inch) equivalent to 0.16 g. of palladium, 100 ml. of normal hexane as a solvent and 76.2 g. of cyclohexene as a cycloolefin were put into a 500 ml. autoclave with electromagnetic agitator. A synthetic gas ($H_2/CO=1.2$) was fed into the autoclave in the same manner as in Example 1. Then the contents were heated with agitation, the reaction began at a temperature of 112° C. The contents were kept at 115° C. for 30 minutes and were cooled and the product was removed. The results are as follows:

| Additive | Reaction-Beginning Temp. (° C.) | Reaction Temp. (° C.) | Reaction Time (min.) | Amount of Olefin Reacted (percent) | Aldehyde (percent) | Higher Boiling Substance (percent) |
|---|---|---|---|---|---|---|
| Not added | 168 | 168 | 10 | 66.2 | 85 | 7 |
| Palladium on carbon carrier | 112 | 115 | 30 | 15.3 | 99 | Trace |

Example 11

Cobalt naphthenate equivalent to 0.22 g. of cobalt, palladium on carbon carrier (containing 5% palladium and of a size passing through a screen of 300 meshes per inch) equivalent to 0.16 g. of palladium, 100 ml. of normal hexane or diethyl ether as a solvent and 99.1 g. of styrene were weighed and put into a 500 ml. autoclave with electromagnetic agitator. A synthesis gas $$(H_2/CO=1.2)$$

was fed into the autoclave in the same manner as in Example 1 and the contents were reacted in the same fashion.

When a palladium on carbon carrier was not used, the reaction did not start even at the temperature elevated up to 210° C. and only a polymer was formed at that temperature. When a palladium on carbon carrier was used, the following results were obtained.

| Solvents | Reaction-Beginning Temp. (° C.) | Reaction Temp. (° C.) | Reaction Time (min.) | Amount of Olefin Reacted (percent) | Aldehyde (percent) | Ethylbenzene (percent) | Higher Boiling Substance (percent) |
|---|---|---|---|---|---|---|---|
| Diethylether | 90 | 93 | 60 | 56.8 | 45.6 | 32.6 | 22.7 |
| Normal hexane | 108 | 110 | 20 | 53.0 | 34.3 | 34.7 | 31.0 |

The embodiments of the invention in which an exclusive property or privilege is claimed are defined as follows:

1. A process for producing oxygen-containing compounds, such as aldehydes, comprising reacting compounds having olefinic double bonds with carbon monoxide and hydrogen so as to perform a hydroformylation reaction in the presence of a cobalt-containing compound as a catalyst and a promoter selected from the group consisting of palladium supported on carbon and platinum supported on carbon, the promoter being present in an amount of from 0.005 to 1.5% by weight, calculated as the metal, based on the weight of the compounds having an olefinic double bond, the hydroformylation reaction being carried out in a hydroformylation reaction zone at a temperature of 30 to 200° C. under a pressure of 40 to 500 kg./cm.$^2$ in the presence of a diluent inert to said compound.

2. A process according to claim 1 wherein the compound having an olefinic double bond is selected from the group consisting of propylene, cyclohexene and styrene.

3. A process according to claim 1 wherein the cobalt-containing compound is selected from the group consisting of organic salts of cobalt, inorganic salts of cobalt and cobalt carbonyl.

4. A process according to claim 1 wherein the carbon is active carbon.

5. A process according to claim 1 wherein the amount of palladium or platinum, calculated as the metal, supported on carbon is 0.5 to 15% based on the weight of the carbon.

6. A process according to claim 1 wherein the inert diluent is selected from the group consisting of saturated hydrocarbons, alcohols, ethers and hydroformylation products.

7. A process according to claim 1 in which the amount of the promoter is from 0.02 to 0.6%, calculated as the metal, based on the weight of the compounds having an olefinic double bond.

8. A process according to claim 5 in which the amount of the palladium or platinum, calculated as the metal, is from 3 to 10% by weight based on the weight of the carbon.

9. A process for producing oxygen-containing compounds composed mostly of alcohols, comprising reacting compounds having olefinic double bonds with carbon monoxide and hydrogen so as to perform a hydroformylation reaction in the presence of a cobalt-containing compound as a catalyst and a promoter selected from the group consisting of palladium supported on carbon and platinum supported on carbon, the promoter being present in an amount of from 0.005 to 1.5% by weight, calculated as the metal, based on the weight of the compounds having an olefinic double bond, the hydroformylation reaction being carried out in a hydroformylation reaction zone at a temperature of 30 to 200° C. under a pressure of 40 to 500 kg./cm.$^2$ in the presence of a diluent inert to said compound, then introducing the reaction product without change into a hydrogenating reaction zone, carrying out a hydrogenating reaction at a temperature of 30 to 200° C. under a hydrogen pressure of 1 to 250 kg./cm.$^2$ and separating and recovering from the reaction product the metallic cobalt produced by the decomposition of the cobalt carbonyl and deposited on the promoter.

10. The process according to claim 9 wherein the compound having an olefinic double bond is selected from the group consisting of propylene, cyclohexene and styrene.

11. The process according to claim 9 wherein the cobalt-containing compound is selected from the group consisting of organic salts of cobalt, inorganic salts of cobalt and cobalt carbonyl compounds.

12. The process according to claim 9 wherein the cobalt-containing substance consisting of metallic cobalt produced by the decomposition of the cobalt carbonyl present in the hydroformylation product in the hydrogenating reaction zone and deposited on the promoter is recirculated and used as a catalyst.

13. The process according to claim 9 wherein the carbon is active carbon.

14. The process according to claim 9 wherein the amount of palladium or platinum, calculated as the metal, supported on carbon is 0.5 to 15% by weight based on the weight of the carbon.

References Cited

UNITED STATES PATENTS

| | | | |
|---|---|---|---|
| 2,628,981 | 2/1953 | Burney et al. | 260—638 |
| 2,829,170 | 4/1958 | Moore | 260—604 |
| 3,312,742 | 4/1967 | Schneider | 260—598 |

FOREIGN PATENTS 662,706   12/1951   Great Britain.

BERNARD HELFIN, *Primary Examiner.*